US012608637B2

(12) United States Patent
Hudek et al.

(10) Patent No.: US 12,608,637 B2
(45) Date of Patent: Apr. 21, 2026

(54) ACTIVE PIEZO STABILIZATION OF AN ION TRAP

(71) Applicant: IonQ, Inc., College Park, MD (US)

(72) Inventors: Kai Makoto Hudek, Hyattsville, MD (US); Jason Madjdi Amini, Takoma Park, MD (US)

(73) Assignee: IonQ, Inc., College Park, MD (US)

( * ) Notice: Subject to any disclaimer, the term of this patent is extended or adjusted under 35 U.S.C. 154(b) by 382 days.

(21) Appl. No.: 18/505,760

(22) Filed: Nov. 9, 2023

(65) Prior Publication Data

US 2024/0159524 A1     May 16, 2024

Related U.S. Application Data

(60) Provisional application No. 63/383,371, filed on Nov. 11, 2022.

(51) Int. Cl.
*G06N 10/40* (2022.01)

(52) U.S. Cl.
CPC .................................... *G06N 10/40* (2022.01)

(58) Field of Classification Search
USPC ...................................................... 250/396 R
See application file for complete search history.

(56) References Cited

U.S. PATENT DOCUMENTS

| | | | |
|---|---|---|---|
| 7,859,350 B1 * | 12/2010 | Schwindt | G04F 5/14 331/3 |
| 2023/0132301 A1 * | 4/2023 | Debnath | G06N 10/40 356/301 |

* cited by examiner

*Primary Examiner* — Kiet T Nguyen
(74) *Attorney, Agent, or Firm* — ARENTFOX SCHIFF LLP

(57) ABSTRACT

Aspects of the present disclosure relate generally to systems and methods for use in the implementation and/or operation of quantum information processing (QIP) systems, and more particularly, to provide stabilization of a position of an ion trap via displacement of one or more piezoelectric elements.

22 Claims, 11 Drawing Sheets

ACTIVE PIEZO STABILIZATION OF AN ION TRAP

CROSS-REFERENCE TO RELATED APPLICATIONS

This application claims the benefit of U.S. Provisional Patent Application No. 63/383,371, filed Nov. 11, 2022, and hereby incorporates by reference herein the contents of this application.

TECHNICAL FIELD

Aspects of the present disclosure relate generally to systems and methods for use in the implementation, operation, and/or use of quantum information processing (QIP) systems.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, control, and/or functionality of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of systems and methods for active piezo stabilization of a position of an ion trap relative to components of a QIP system.

In some aspects, a quantum information processing (QIP) system includes an ion trap system. The ion trap system includes an ion trap substrate configured to trap one or more ions, a piezoelectric element coupled to the ion trap substrate, and a carrier configured to transmit signals between the ion trap substrate and components of the QIP system.

In some aspects, a method for active piezoelectric stabilization of an ion trap includes: determining, by a controller including a processor and a memory, that ions trapped in an ion trap substrate are likely misaligned relative to a Raman beam; determining, by the controller, an amount of displacement between the ion trap substrate and the Raman beam;

determining, by the controller, an amount of voltage to apply to a piezoelectric element coupled to the ion trap substrate to compensate for the determined displacement; and commanding, by the controller, a voltage source to apply the determined voltage to the piezoelectric element to adjust a position of the ion trap substrate to align the ions trapped in the ion trap substrate with the Raman beam.

In some aspects, a method for active piezoelectric stabilization of an imaging system including at least one of a lens and a detector includes: determining, by a controller including a processor and a memory, that ions trapped in an ion trap substrate are likely misaligned relative to at least one of the lens and the detector; determining, by the controller, an amount of displacement between the ion trap substrate and at least one of the lens and the detector; determining, by the controller, an amount of voltage to apply to a piezoelectric element coupled to the ion trap substrate to compensate for the determined displacement; and commanding, by the controller, a voltage source to apply the determined voltage to the piezoelectric element to adjust a position of the ion trap substrate to align the ions trapped in the ion trap substrate with at least one of the lens and the detector.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well known components.

As is described in greater detail below, operations of the QIP system involve manipulation of high-fidelity gates on trapped ions inside an ion trap with lasers (e.g., qubit manipulation beams such as Raman beams). Manipulating the trapped ions requires precise position stability between the qubit manipulation beams and the trapped ions. The position of the trapped ions is determined by static and oscillatory electric fields generated by the ion trap, which in turn are determined by the position of the ion trap. The ion trap is typically rigidly mounted to the QIP system. Laser beams used for manipulating the trapped ions (such as Raman beams) propagate over and/or through the ion trap so as to be incident on the ions. Here, we refer to these laser beams as Raman beams, but might be any configuration of lasers used for such manipulation. During operation of the QIP system, the position of the ion trap and/or the Raman beams may change due to drift and/or vibration of the mechanical ion trap mount, flexion of the optics table, and so forth. This drift and/or vibration may reduce the fidelity of the interaction between the qubit manipulation beams and the trapped ions.

Conventional attempts to minimize the effects of drift and/or vibrations on the fidelity of the qubit manipulation beams may be passive or active. An example passive strategy is the use of bulkier and/or stiffer mechanical mounts for the ion trap and/or components of imaging systems of the QIP system. An example active strategy is to stabilize an optical element in the Raman beam path to direct the Raman beam to the desired portion of the ion trap. However, the Raman bean is typically tightly integrated with bulky structures, such as lens stacks, which may reduce the bandwidth and efficacy of an active stabilization system.

Solutions to the issues described above are explained in more detail in connection with FIGS. 1-12, with FIGS. 1-3 providing a background of QIP systems or quantum computers, and more specifically, of atomic-based QIP systems or quantum computers.

Figure 1:
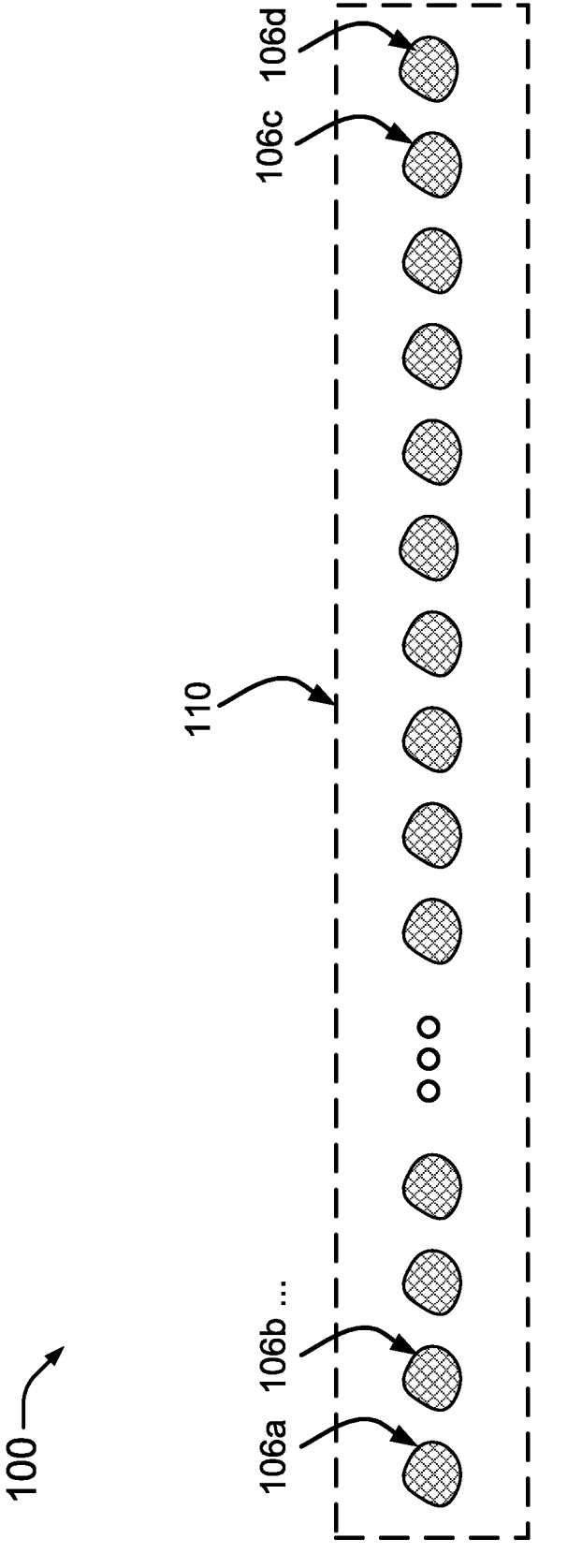
FIG. 1 illustrates a view of atomic ions of a linear crystal or chain in accordance with aspects of this disclosure.
Figure 2:
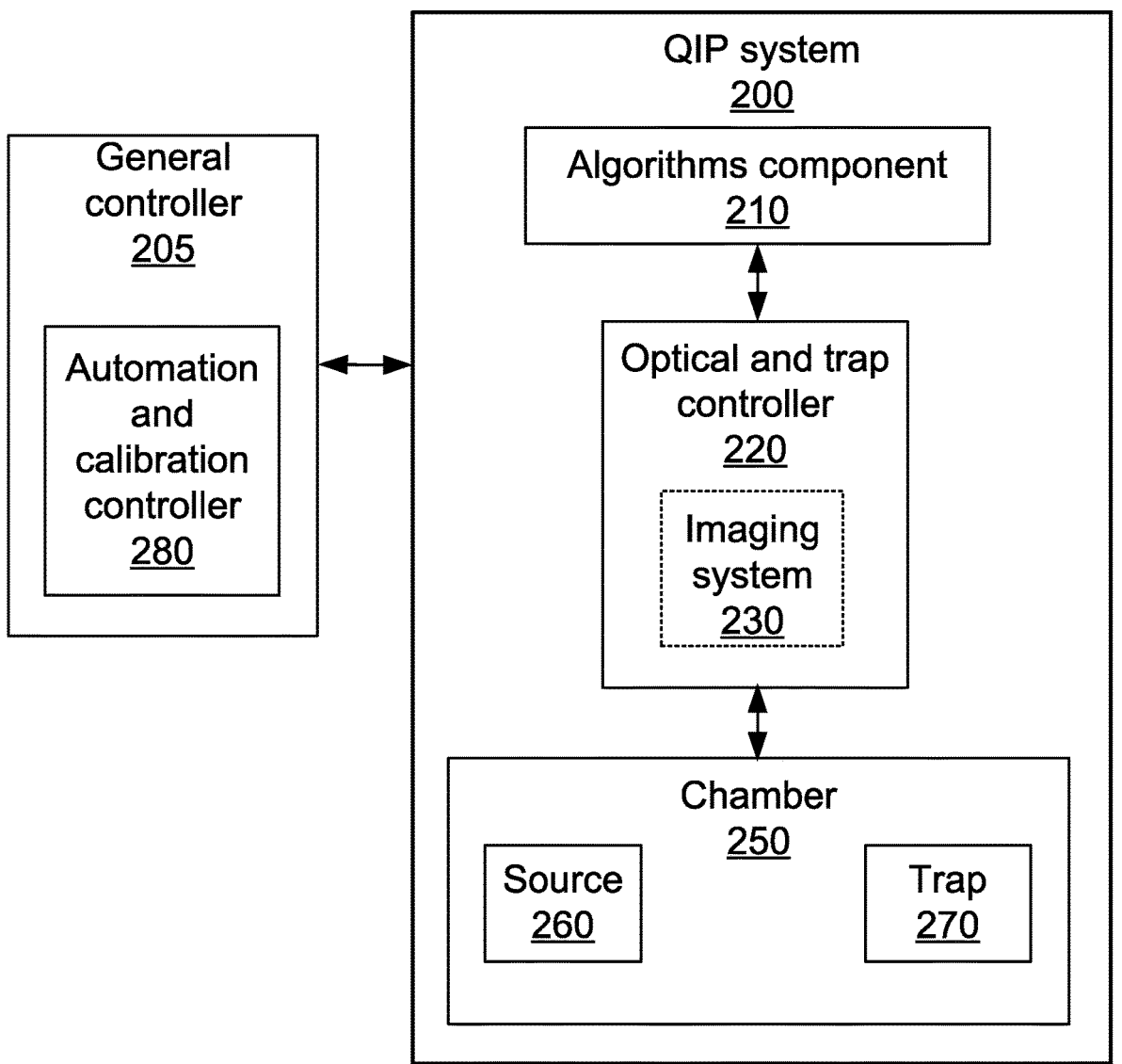
FIG. 2 illustrates an example of a quantum information processing (QIP) system in accordance with aspects of this disclosure.

FIG. 1 illustrates a diagram 100 with multiple atomic ions or ions 106 (e.g., ions 106a, 106b, . . . , 106c, and 106d) trapped in a linear crystal or chain 110 using a trap (not shown; the trap can be inside a vacuum chamber as shown in FIG. 2). The trap may be referred to as an ion trap. The ion trap shown may be built or fabricated on a semiconductor substrate, a dielectric substrate, or a glass die or wafer (also referred to as a glass substrate). The ions 106 may be provided to the trap as atomic species for ionization and confinement into the chain 110. Some or all of the ions 106 may be configured to operate as qubits in a QIP system.

In the example shown in FIG. 1, the trap includes electrodes for trapping or confining multiple ions into the chain 110 laser-cooled to be nearly at rest. The number of ions trapped can be configurable and more or fewer ions may be trapped. The ions can be Ytterbium ions (e.g., $^{171}Yb^+$ ions), for example. The ions are illuminated with laser (optical) radiation tuned to a resonance in $^{171}Yb^+$ and the fluorescence of the ions is imaged onto a camera or some other type of detection device (e.g., photomultiplier tube or PMT). In this example, ions may be separated by a few microns ($\mu m$) from each other, although the separation may vary based on architectural configuration. The separation of the ions is determined by a balance between the external confinement force and Coulomb repulsion and does not need to be uniform. Moreover, in addition to Ytterbium ions, neutral atoms, Rydberg atoms, or other types of atomic-based qubit technologies may also be used. Moreover, ions of the same species, ions of different species, and/or different isotopes of ions may be used. The trap may be a linear RF Paul trap, but other types of confinement devices may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

FIG. 2 illustrates a block diagram that shows an example of a QIP system 200. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations. The quantum and classical computations and operations may interact in such a hybrid system.

Shown in FIG. 2 is a general controller 205 configured to perform various control operations of the QIP system 200. These control operations may be performed by an operator, may be automated, or a combination of both. Instructions for at least some of the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200. These calibration, testing, and automation operations may involve, for example, all or part of an algorithms component 210, all or part of an optical and trap controller 220 and/or all or part of a chamber 250.

The QIP system 200 may include the algorithms component 210 mentioned above, which may operate with other parts of the QIP system 200 to perform or implement quantum algorithms, quantum applications, or quantum operations. The algorithms component 210 may be used to perform or implement a stack or sequence of combinations of single qubit operations and/or multi-qubit operations (e.g., two-qubit operations) as well as extended quantum computations. The algorithms component 210 may also include software tools (e.g., compilers) that facilitate such performance or implementation. As such, the algorithms component 210 may provide, directly or indirectly, instructions to various components of the QIP system 200 (e.g., to the optical and trap controller 220) to enable the performance or implementation of the quantum algorithms, quantum applications, or quantum operations. The algorithms component 210 may receive information resulting from the performance or implementation of the quantum algorithms, quantum applications, or quantum operations and may process the information and/or transfer the information to another component of the QIP system 200 or to another device (e.g., an external device connected to the QIP system 200) for further processing.

The QIP system 200 may include the optical and trap controller 220 mentioned above, which controls various aspects of a trap 270 in the chamber 250, including the generation of signals to control the trap 270. The optical and trap controller 220 may also control the operation of lasers, optical systems, and optical components that are used to provide the optical beams that interact with the atoms or ions in the trap. Optical systems that include multiple components may be referred to as optical assemblies. The optical beams are used to set up the ions, to perform or implement quantum algorithms, quantum applications, or quantum operations with the ions, and to read results from the ions. Control of the operations of laser, optical systems, and optical components may include dynamically changing operational parameters and/or configurations, including controlling positioning using motorized mounts or holders. When used to confine or trap ions, the trap 270 may be referred to as an ion trap. The trap 270, however, may also be used to trap neutral atoms, Rydberg atoms, and other types of atomic-based qubits. The lasers, optical systems, and optical components can be at least partially located in the optical and trap controller 220, an imaging system 230, and/or in the chamber 250.

The QIP system 200 may include the imaging system 230. The imaging system 230 may include a high-resolution imager (e.g., CCD camera) or other type of detection device (e.g., PMT) for monitoring the ions while they are being provided to the trap 270 and/or after they have been provided to the trap 270 (e.g., to read results). In an aspect, the imaging system 230 can be implemented separate from the optical and trap controller 220, however, the use of fluorescence to detect, identify, and label ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of what may be referred to as a processor or processing portion of the QIP system 200. That is, the trap 270 may be considered at the core of the processing operations of the QIP system 200 since it holds the atomic-based qubits that are used to perform or implement the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Aspects of this disclosure may be implemented at least partially to actively manipulate a position of the ion trap 270 relative to one or more components of the optical system (e.g., laser beams) of the QIP system. Aspects of the disclosure may be implemented at least partially to manipulate a position of the ion trap 270 relative to one or more components of the imaging system 230.

Figure 3:
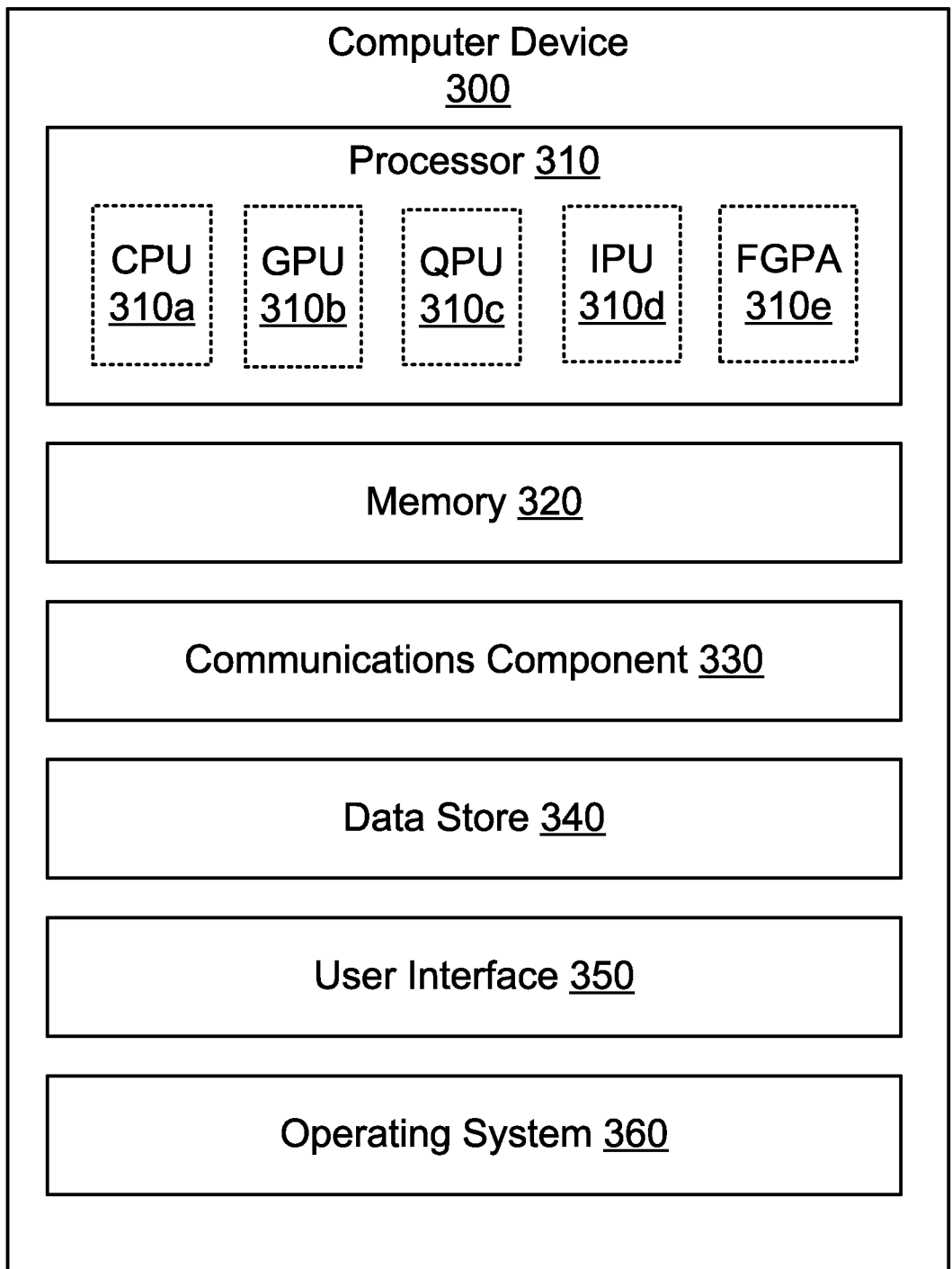
FIG. 3 illustrates an example of a computer device in accordance with aspects of this disclosure.

Referring now to FIG. 3, an example of a computer system or device 300 is shown. The computer device 300 may represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single processor, multiple set of processors, or one or more multi-core processors. Moreover, the processor 310 may be implemented as an integrated processing system and/or a distributed processing system. The processor 310 may include one or more central processing units (CPUs) 310a, one or more graphics processing units (GPUs) 310b, one or more quantum processing units (QPUs) 310c, one or more intelligence processing units (IPUs) 310d (e.g., artificial intelligence or AI processors), one or more field-programmable gate arrays (FPGAs) 310e, or a combination of some or all those types of processors. In one aspect, the processor 310 may refer to a general processor of the computer device 300, which may also include additional processors 310 to perform more specific functions (e.g., including functions to control the operation of the computer device 300). Quantum operations may be performed by the QPUs 310c. Some or all of the QPUs 310c may use atomic-based qubits, however, it is possible that different QPUs are based on different qubit technologies.

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

Figure 4:
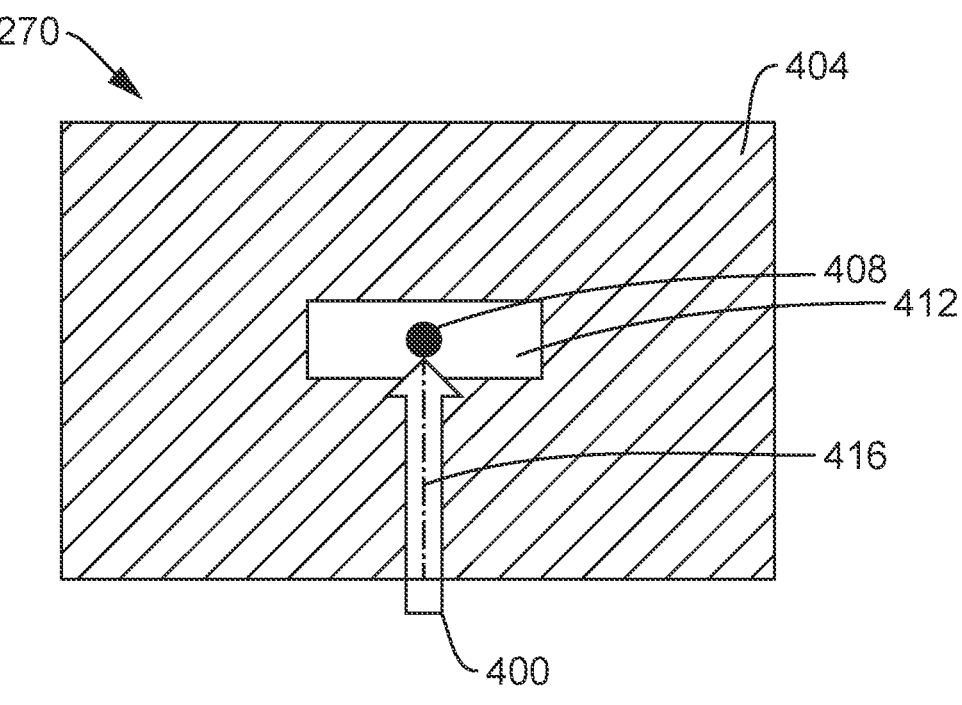
FIG. 4 illustrates an example schematic representation of an ion trap being addressed by a Raman beam in accordance with aspects of this disclosure.

FIG. 4 illustrates an example schematic representation of the ion trap 270 being addressed by a Raman beam 400. The ion trap 270 includes a trap substrate 404 and one or more ions 408 trapped within an ion trapping region 412. The one or more ions are schematically represented as element 408. The ions 408 may be arranged in an ion chain. The ion trap 270 includes features that are configured to confine the ions 408 at predefined areas within the ion trapping region 412. Such features can be configured to produce radio frequency (RF) voltages and/or static voltages at one or more positions within the ion trapping region 412 of the ion trap 270. In the configuration illustrated in FIG. 4, the ion trap 270 is substantially stationary, and the Raman beam 400 is aligned with one or more of the trapped ions 408 along axis 416. However, if the trap 270 moves relative to the Raman beam 400 (e.g., due to vibration in the foundation supporting the quantum computer, the mount for the laser generating the Raman beam 400, flexion of the optical table, and so forth), the trapped ions 408 will move with the ion trap 270.

Figure 5:
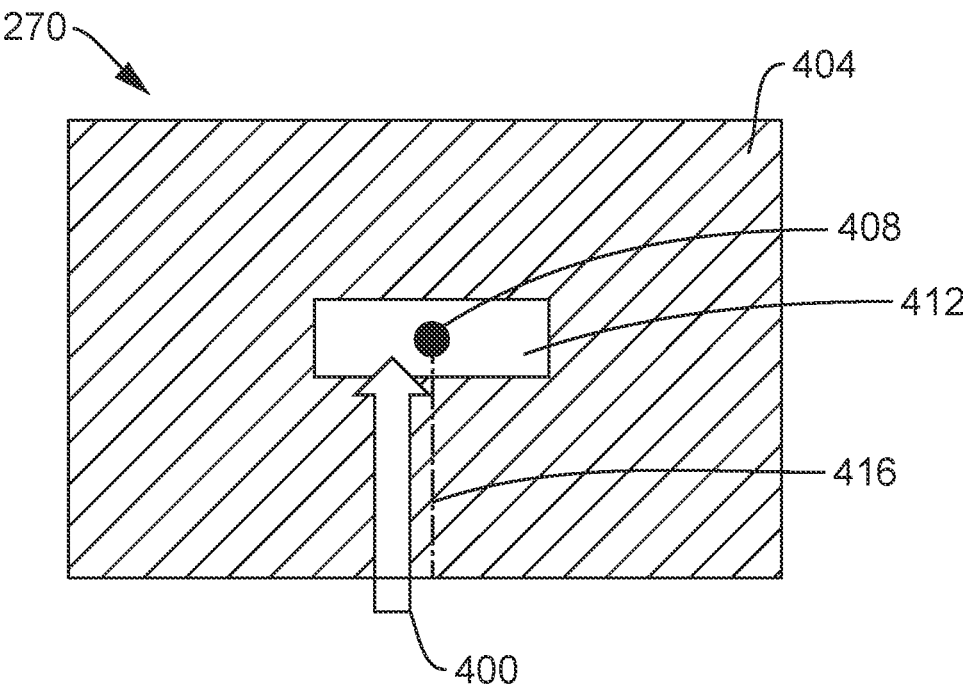
FIG. 5 illustrates an example schematic representation of the ion trap of FIG. 4 in which a disturbance along an axis of ions trapped in the ion trap has occurred.

For example, FIG. 5 illustrates a configuration in which there has been a displacement from the axis 416 due to either movement of the trap, the Raman beam, or both. The disturbance may be static or may be time dependent (e.g., such as disturbance due to vibrations). As shown in FIG. 5, this disturbance may cause misalignment between the Raman beam 400 and the axis 416 and, consequently, misalignment to the trapped ions 408. Conventionally, this misalignment is either ignored, or the position of the Raman beam 400 is adjusted to bring the Raman beam 400 into alignment with the ion chain 408. However, in the present disclosure, the position of the ion trap 270 may be adjusted to bring the axis 416 into alignment with the Raman beam 400, as shown schematically by the arrow A in FIG. 6. In such aspects, the position of the Raman beam 400 is not adjusted. In such aspects, the ion trap 270 may be configured to track (e.g., follow) movement of the Raman beam 400. Such adjustment may be referred to as active stabilization of the position of the ion trap 270. Moving the ion trap 270 rather than the laser generating the Raman beam 400 is advantageous because the ion trap 270 is smaller and lighter than the optics that steer the Raman beam.

Figure 6:
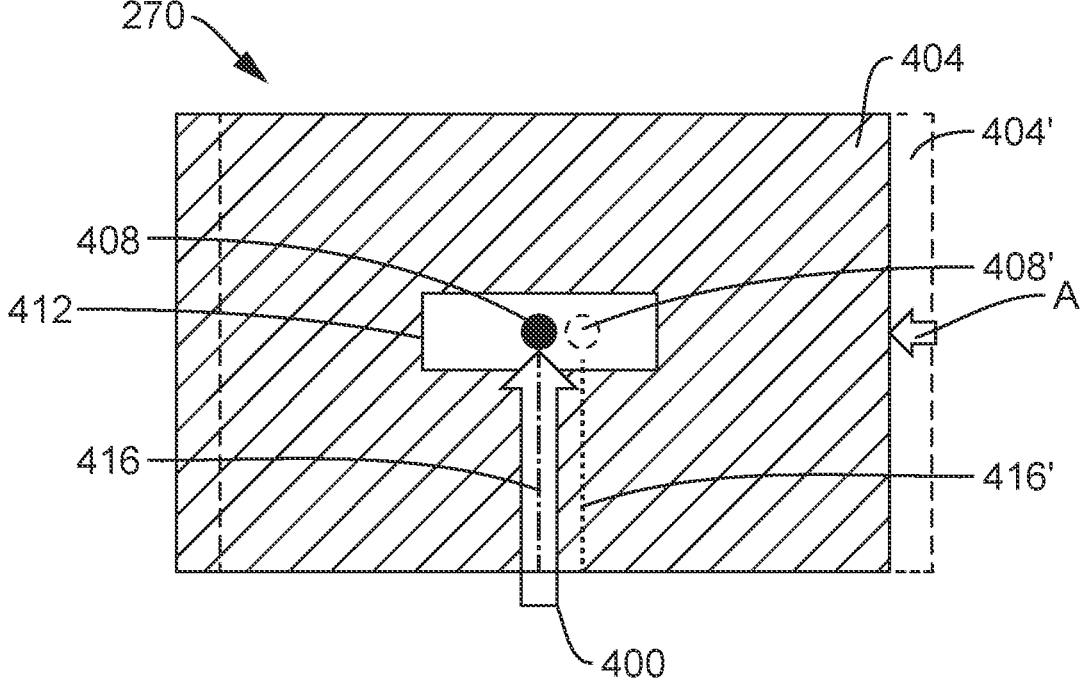
FIG. 6 illustrates an example schematic representation of the repositioning of the ion trap of FIG. 4 to re-align the ion trap with the Raman beam in accordance with aspects of this disclosure.

In FIG. 6, the dashed lines show the position of the substrate 404' and the ions 408' in a first position in which the trapped ions 408' are displaced from the Raman beam 400. As described in greater detail below, in response to determining that displacement has occurred between the Raman beam 400 and the axis 416', the controller 205 is configured to reposition the ion trap 270 to re-align the axis 416 with the Raman beam 400, as indicated by the arrow A.

Figure 7:
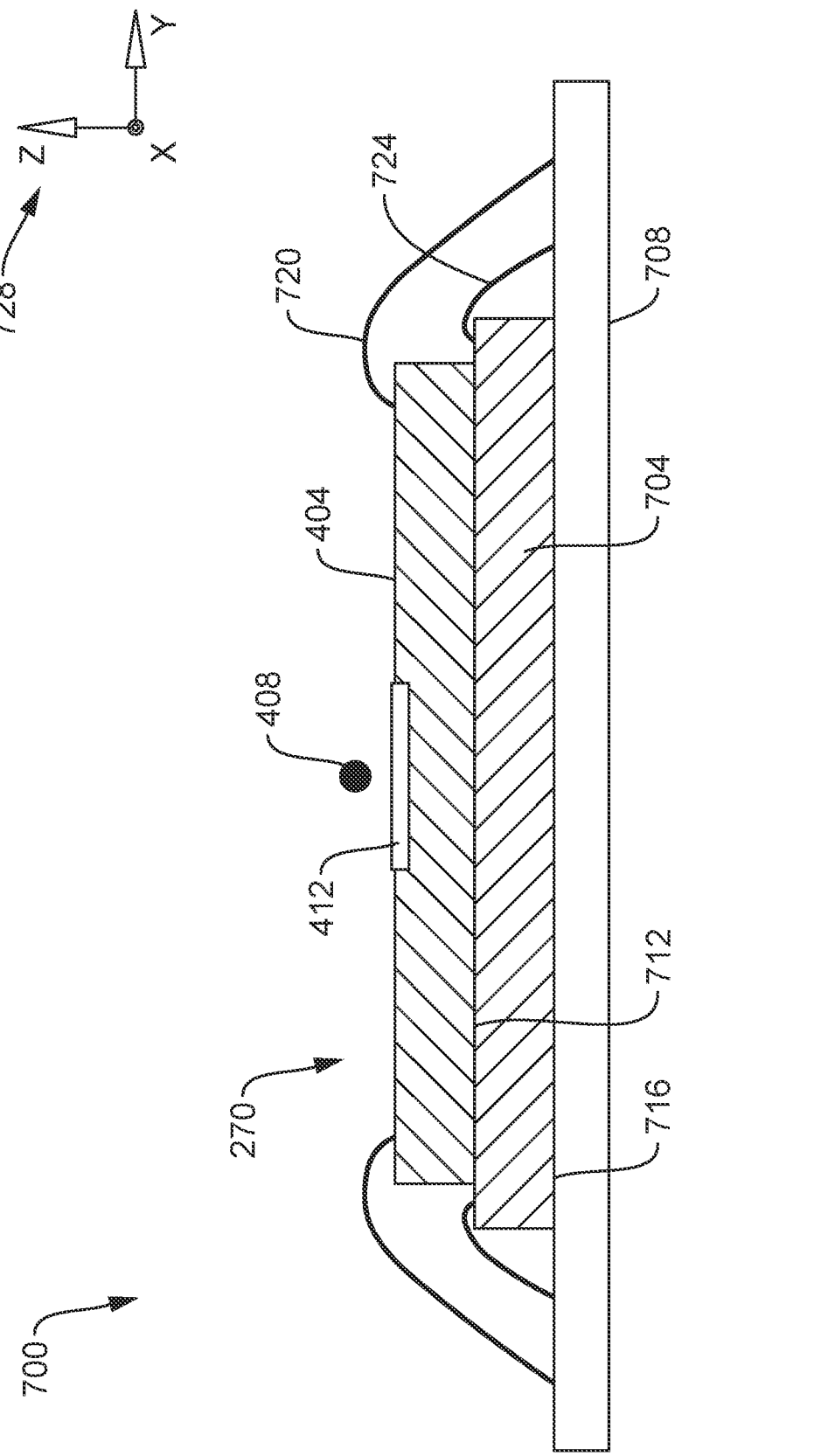
FIG. 7 illustrates a cross-sectional view of an example repositionable ion trap system in accordance with aspects of this disclosure.

FIG. 7 illustrates a cross-sectional view of an example repositionable ion trap system 700 according to an aspect of the present disclosure. In some aspects, the system 700 may be referred to as a "stackup." As shown in FIG. 7, a piezoelectric element 704 is positioned between the ion trap 270 and a carrier 708. The piezoelectric element 704 includes a piezoelectric material that can withstand the high-vacuum environmental operating conditions of the QIP system 200. As referred to herein, the term "piezoelectric material" refers to a layer or material, such as a crystal or ceramic, that undergoes the converse piezoelectric effect, in which the material undergoes a displacement in response to an electric field generated by an applied electrical voltage. In some aspects, the displacement may be in the direction of the electric field generated by the applied voltage (e.g. substantially parallel to the electric field). In some aspects, the displacement can be substantially perpendicular to the electric field, in which case the configuration may also be referred to as a "shear piezo." The piezoelectric material may elongate in response to the applied voltage or might contract in response to the applied electric voltage.

With continued reference to FIG. 7, the repositionable ion trap system 700 includes the ion trap 270, one or more piezoelectric elements 704, and a carrier 708. The ion trap 270 is coupled to a first surface 712 of the piezoelectric element 704. The second surface 716 of the piezoelectric element 704 is coupled to the carrier 708. A first flexible electrical connection 720 forms an electrical connection between the ion trap 270 and to the carrier 708. In some aspects, the first flexible electrical connection 720 includes one or more wire bonds. The ion trap 270 is configured to send and receive electrical signals to and from the carrier 708 over the first flexible electrical connection 720. The carrier 708 transmits electrical signals received from other components of the QIP system 200 to the ion trap 270 and transmits electrical signals received from the ion trap 270 to other components of the QIP system 200. The carrier 708 is rigidly coupled to the vacuum system. For example, in some aspects, the carrier 708 may be coupled to a cold finger or other type of support structure positioned in a cryostat system. In another example, in some aspects, the carrier 708 may be coupled to a support structure positioned in a non-cryostat vacuum system.

A second flexible electrical connection 724 forms an electrical connection between the piezoelectric element 704 and the carrier 708. In some aspects, the second flexible electrical connection 724 includes one or more wire bonds. Electrical voltages may be applied to the piezoelectric element 704 via the second flexible electrical connection 724 to cause displacement in the piezoelectric element 704. The ion trap 270 is movable relative to the carrier 708 upon the application of an electrical voltage to the piezoelectric element 704. In some aspects, the applied voltage may be from a few volts to a few hundred volts. For example, in some aspects, the applied voltage may be from 1 V to about 300 V. Therefore, in response to determining that misalignment between the Raman beam 400 and the axis 416 has occurred, a voltage can be applied, increased, and/or decreased to dynamically adjust the positioning of the ion trap 270 to bring the ion trap 270 and axis 416 into alignment with the Raman beam 400. In some aspects, piezoelectric element 704 can dynamically adjust the positioning of the ion trap 270 in the direction shown by of the X-axis, the Y-axis, or the Z-axis (e.g., lift the ion trap 270 relative to the carrier 708) of the coordinate plane 728. In contrast, conventional ion traps are rigidly bonded to a carrier material, such that the Ion trap and the carrier material move together.

In some aspects, the piezoelectric element 704 can be used to reposition the ion trap 270 relative to the Raman beam 400 during a calibration process. In such aspects, the voltage applied to the piezoelectric element 704 is configured to cause displacement of the piezoelectric element 704 (and therefore movement of the ion trap 270) at the micrometer (μm) scale or the nanometer (nm) scale.

In some aspects, the piezoelectric element 704 can be used to dynamically reposition (e.g., actively stabilize) the trap 270 relative to the Raman beam 400 during operation of the QIP system 200. Dynamic adjustments may compensate for recurrent disturbances to the Raman beam 400 and/or the trap 270 due to vibrations in the foundation supporting the quantum computer, the mount of the laser, flexion of the optical table, and so forth. In such aspects, the voltage applied to the piezoelectric element 704 is configured to cause displacement of the piezoelectric element 704 (and therefore movement of the ion trap 270) at the micrometer (μm) or nanometer (nm) scale. In such aspects, the displacements may be at the scale of hundreds of nanometers or a few micrometers.

In some aspects, the system 700 includes more than one piezoelectric element 704. In such aspects, each of the piezoelectric elements 704 is stacked between the ion trap 270 and the carrier 708. In such aspects, the orientation of the different layers of piezoelectric elements 704 can be configured such that actuation (e.g., the selective application of an electric field to) the different piezoelectric elements can dynamically adjust the positioning of the ion trap 270 in different directions (e.g., move along an of the axes of the coordinate plane 728 that the piezoelectric element 704 is configured to move along).

In the embodiment of FIG. 7, the piezoelectric element 704 is longer than the substrate 404 of the ion trap 270. In other aspects, the piezoelectric element 704 may be shorter than the substrate 404 of the ion trap 270. For example, in some aspects, the piezoelectric element 704 may have the same footprint as the ion trapping region 412. In some aspects, microelectromechanical systems (MEMS) elements and/or elements configured for thermal expansion may be used instead of the piezoelectric elements.

Figure 8A:
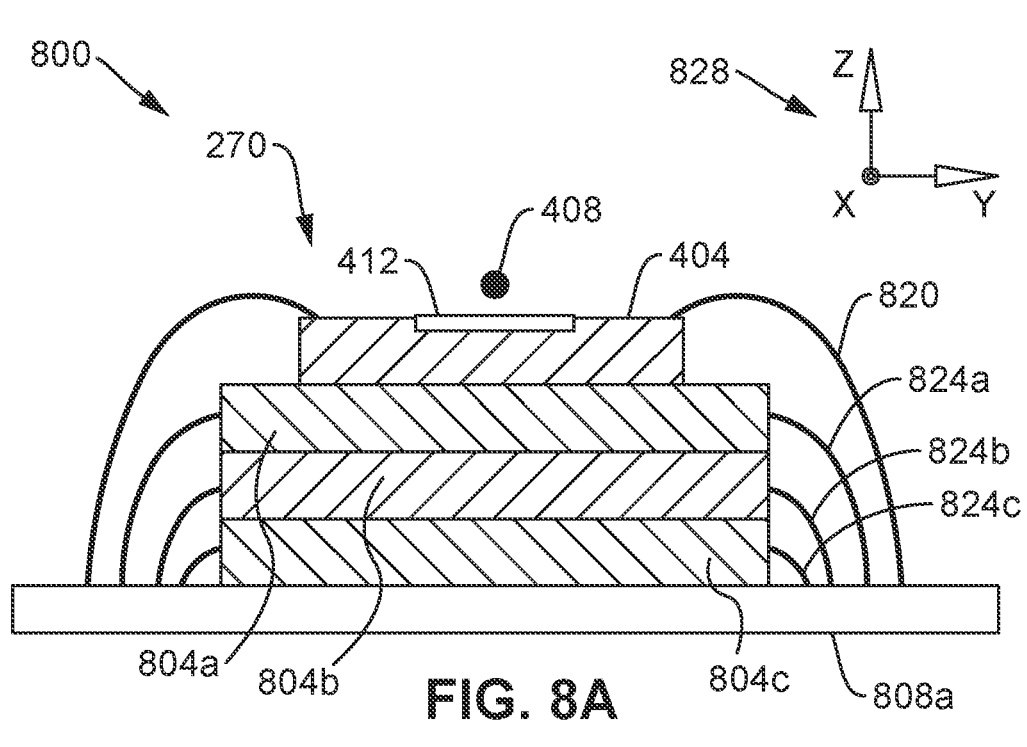
FIGS. 8A-8C illustrates a cross-sectional view of another example repositionable ion trap system in accordance with aspects of this disclosure.
Figure 8B:
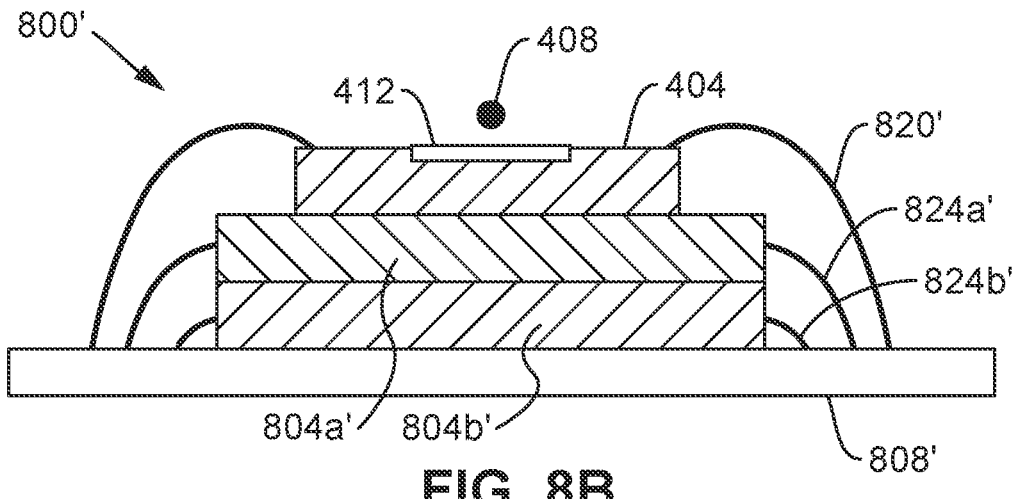
Figure 8C:
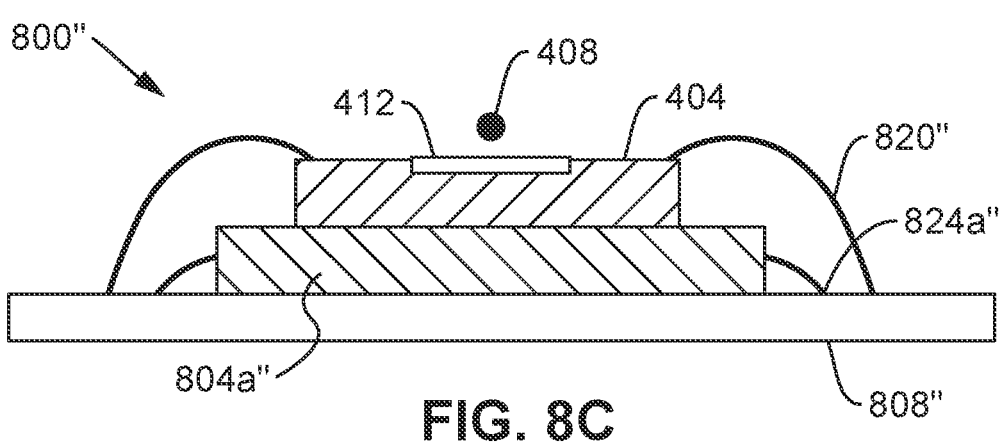

For example, FIGS. 8A, 8B, and 8C illustrate example repositionable ion trap systems 800, 800', and 800", respectively. The repositionable ion trap systems 800, 800', and 800" are substantially similar to the repositionable ion trap system 700 described above. The repositionable ion trap systems 800, 800', 800" are only described herein as they differ from the repositionable ion trap system 700. Like numbers are used to indicate like parts between the repositionable ion trap system 700 and the repositionable ion trap systems 800, 800', 800".

As shown in FIG. 8A, the repositionable ion trap system 800 includes three piezoelectric elements 804a, 804b, 804c. The piezoelectric elements 804a, 804b, 804c are electrically connected to the carrier 808 by the flexible electrical connections 824a, 824b, 824c. The ion trap 270 is bonded to (or otherwise coupled to) the top face of the piezoelectric element 804a. The lower face of the piezoelectric element 804a is bonded to (or otherwise coupled to) the top face of piezoelectric element 804b. The lower face of the piezoelectric element 804b is bonded to (or otherwise coupled to) the top face of the piezoelectric element 804c. The bottom face of the piezoelectric element 804c is bonded to (or otherwise coupled to) the carrier 808a. The piezoelectric elements 804a, 804b, 804c are configured to dynamically adjust the positioning of the ion trap 270 relative to the carrier 808.

In the configuration illustrated in FIG. 8A, each of the piezoelectric elements 804a, 804b, 804c is configured to dynamically adjust the positioning of the ion trap 270 in a different direction than the other piezoelectric elements 804a, 804b, 804c. For example, the piezoelectric element 804a is configured to move the ion trap 270 along the X-axis of the coordinate plane 828. The piezoelectric element 804b is configured to move the ion trap 270 along the Y-axis of the coordinate plane 828. The piezoelectric element 804c is configured to move the ion trap 270 along the Z-axis of the coordinate plane 828. In other aspects, the piezoelectric elements 804a, 804b, 804c may be configured to move the ion trap 270 around different ones of the X-axis, Y-axis, and Z-axis of the coordinate plane 828, or different axes altogether. For example, the piezoelectric elements 804a, 804b, 804c may be configured to tip or tilt the ion trap 270 around the X-axis or Y-axis, and/or rotate the ion trap 270 about the Z-axis.

As shown in FIG. 8B, the repositionable ion trap system 800' includes two piezoelectric elements 804a' and 804b'. The piezoelectric elements 804a' and 804b' are electrically connected to the carrier 808' by the flexible electrical connections 824a' and 824b'. The ion trap 270 is bonded to (or otherwise coupled to) the top face of the piezoelectric element 804a'. The bottom face of piezoelectric element 804a' is bonded to (or otherwise coupled to) the top face of piezoelectric element 804b'. The bottom face of the piezoelectric element 804b' is bonded to (or otherwise coupled to) the top face of the carrier 808'. The piezoelectric elements 804a' and 804b' are configured to move the ion trap 270 relative to the carrier 808'.

In the configuration illustrated in FIG. 8B, each of the piezoelectric elements 804a' and 804b' is configured to move the ion trap 270 in a different direction than the other piezoelectric elements 804a', 804b '. For example, the piezoelectric element 804a' is configured to move the ion trap 270 along the X-axis of the coordinate plane 828. The piezoelectric element 804b' is configured to move the ion trap 270 along the Y-axis of the coordinate plane 828. In other aspects, the piezoelectric elements 804a', 804b' may be configured to move the ion trap 270 around different ones of the X-axis, Y-axis, and Z-axis of the coordinate plane 828, or different axes altogether. For example, the piezoelectric elements 804a', 804b' may tip or tilt the ion trap 270 around the X-axis or Y-axis, and/or rotate the ion trap 270 about the Z-axis.

As shown in FIG. 8C, the repositionable ion trap system 800" includes one piezoelectric element 804a". In the configuration illustrated in FIG. 8C, the piezoelectric element 804a" is configured to move the ion trap 270 along the X-axis of the coordinate plane 828. In other aspects, the piezoelectric element 804a" may be configured to move the ion trap 270 around different ones of the X-axis, Y-axis, and Z-axis of the coordinate plane 828, or different axes all together. For example, the piezoelectric element 804a" may tip or tilt the ion trap 270 around the X-axis or Y-axis, and/or rotate the ion trap 270 about the Z-axis as just one example.

Figure 9:
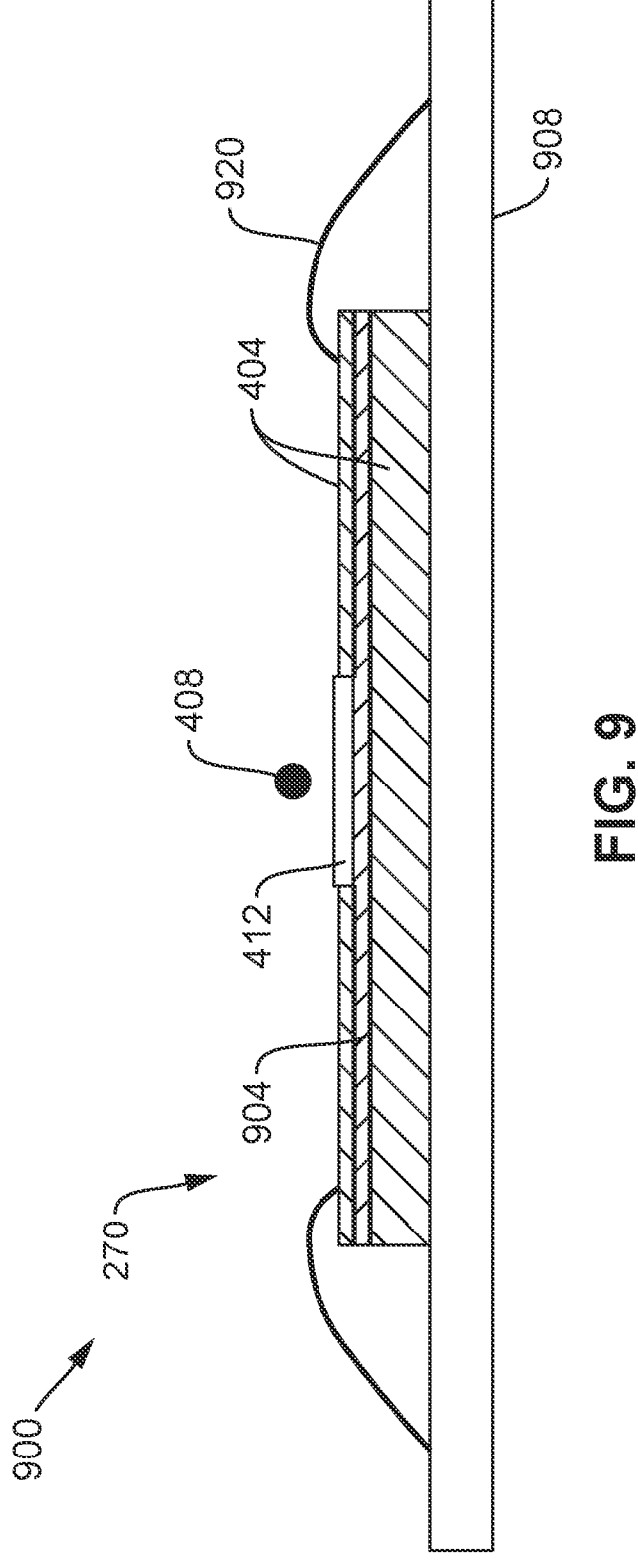
FIG. 9 illustrates another example repositionable ion trap system in accordance with aspects of this disclosure.

FIG. 9 illustrates an example repositionable ion trap system 900 in accordance with an aspect of this disclosure. The repositionable ion trap system 900 is substantially similar to the repositionable ion trap system 700 described above. The repositionable ion trap system 900 is only described herein as it differs from the repositionable ion trap system 700. Like numbers are used to indicate like parts between the repositionable ion trap system 700 and the repositionable ion trap system 900.

In the embodiment illustrated in FIG. 9, one or more piezoelectric elements 904 are integrally formed in the substrate 404 of the ion trap 270. The ion trap 270 is typically manufactured by lithographic processing. In aspects in which the piezoelectric element(s) 904 are integrally formed in the substrate 404 of the ion trap 270, the piezoelectric element(s) 904 may be integrated into the layers of the ion trap 270 during the lithographic process of trap construction. Such configurations may increase the performance of the repositionable ion trap system 100 because the piezoelectric element(s) 904 are as closely integrated into the ion trap 270 as possible. Further, wiring may be integrated into the layers of the ion trap 270 and/or piezoelectric element(s) 904. In the illustrated embodiment, the integrally formed piezoelectric element 904 is shown extending the length of the ion trap 270. In another aspect, the integrally formed piezoelectric element 904 may extend over a portion of the ion trap 270. In such embodiments, fabricated flexures or reliefs may be integrated into the surface of the ion trap 270 to allow relative displacement of different regions of the ion trap 270.

Figure 10:
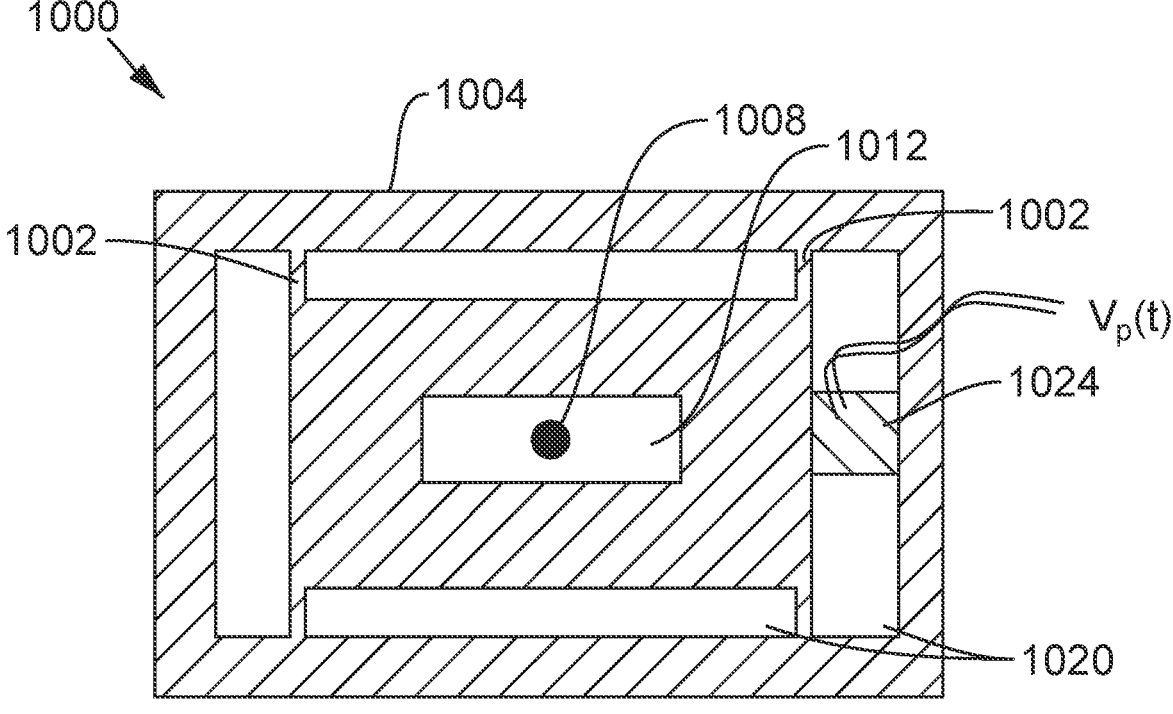
FIG. 10 illustrates an example schematic representation of a repositionable ion trap in accordance with aspects of this disclosure.

FIG. 10 illustrates an example ion trap 1000. The ion trap 1000 is substantially similar to the ion trap 270 described above. The ion trap 1000 is only described herein as it differs from the ion trap 270. Like numbers are used to indicate like parts between the ion trap 1000 and the ion trap 270.

FIG. 10 illustrates an example schematic representation of a repositionable ion trap 1000. The ion trap 1000 includes a plurality of slots 1020. The slots 1020 are configured to allow displacement of the trap electrodes through flexure of the thinner portions 1002 of the ion trap 1000. In the configuration of FIG. 10, a piezoelectric element 1024 is positioned in one of the slots 1020. In the illustrated configuration, the piezoelectric element 1024 is a single piezoelectric element configured to dynamically adjust the positioning of the ion trap 1000 in a single direction. In other aspects, the ion trap 1000 may include a second piezoelectric element configured to dynamically adjust the positioning of the ion trap 1000 in a different direction than the piezoelectric element 1024. In some aspects, the piezoelectric element 1024 may be configured as a shear piezoelectric element. The ion trap 1000 may be configured to allow high displacement and/or flexibility of the trapping region 1012. In some aspects, the slots 1020 may be shaped to amplify the mechanical motion of the piezoelectric element 1024 through mechanical leverage. For example, in some aspects, one or more of the slots 1020 may be configured so that a pivot point of the slot 1020 is off-center, dividing the slot 1020 into a short portion and a long portion. In such aspects, a small displacement of the short portion can create a large displacement of the long portion.

In some aspects, the repositionable ion trap systems 700, 800, 900 and the repositionable ion trap 1000 may be configured to reposition the ion traps 270, 1000 to align the ion chain 408 with other components of the imaging system 230. Moving the ion traps 270, 1000 instead of one or more components of the imaging system 230 is advantageous because the ion traps 270, 1000 are much smaller and lighter than the components of the imaging system 230, and are much easier to align to much higher precision, e.g. at the nanometer scale.

Figure 11:
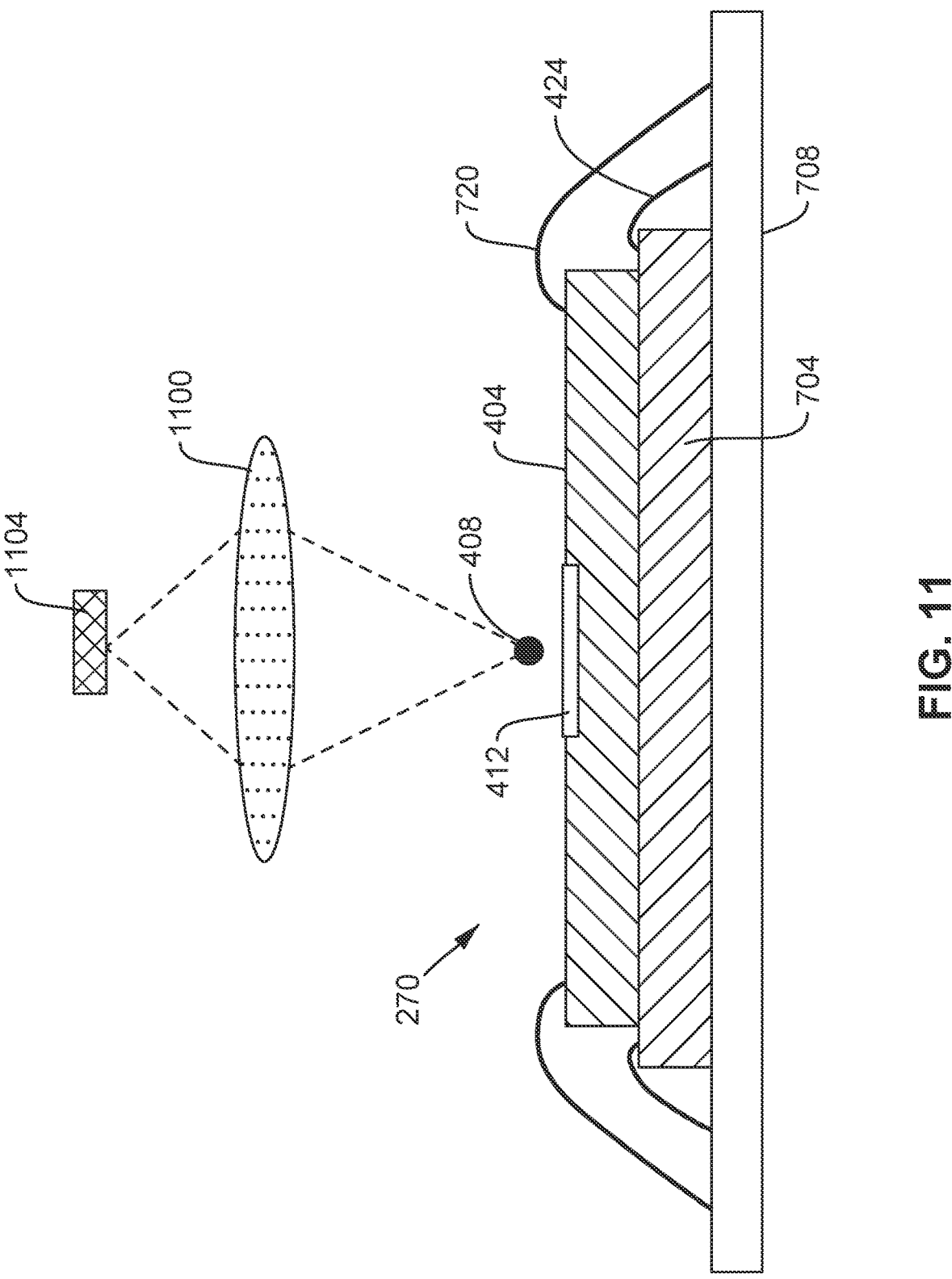
FIG. 11 illustrates a repositionable ion trap system that is configured to reposition an ion trap relative to a lens and a detector of an imaging system of the QIP system in accordance with aspects of this disclosure.

For example, FIG. 11 illustrates an aspect in which the repositionable ion trap system 700 is configured to reposition the ion trap 270 to orient the axis of the ion chain 408 at a focal point of a lens 1100 and a detector 1104 of the imaging system 230 of the QIP system 200. As described in greater detail below, the position of the ion trap 270 can be adjusted relative to the lens 1100 and/or the detector 1104 to align the ion chain 408 with the lens 1100 and/or the detector 1104. In such aspects, the ion trap 270 may track (e.g., follow) movement of the lens 1100 and/or the detector 1104. In some aspects, the voltage applied to the piezoelectric element 704 is configured to cause the ion trap 270 to track movement of the lens 1100 and/or the detector. In some aspects, the piezoelectric element 704 may be used to adjust the position of the ion trap 270 may reduce or eliminate the need to make fine adjustments of the lens 1100 relative to the ion trap 270.

In some aspects, the piezoelectric element 704 can be used to reposition the ion trap 270 relative to the lens 1100 and/or the detector 1104 during a calibration process. In such aspects, the voltage applied to the piezoelectric element 704 is configured to cause displacement of the piezoelectric element 704 (and therefore movement of the ion trap 270) at, or below, the micrometer ($\mu$m) scale.

In some aspects, the piezoelectric element 704 can be used to dynamically reposition the trap 270 relative to the lens 1100 and/or the detector 1104 during operation of the QIP system 200. Dynamic adjustments may compensate for recurrent disturbances to the lens 1100, the detector 1104, and/or the trap 270 due to vibrations from the foundation supporting the quantum computer, flexion of the optical table, and so forth. In such aspects, the voltage applied to the piezoelectric element 704 is configured to cause displacement of the piezoelectric element 704 (and therefore movement of the ion trap 270) at the nanometer (nm) or micrometer ($\mu$m) scale. In such aspects, the displacements may be at the scale of a few micrometers, hundreds of nanometers, tens of nanometers, or even less.

Figure 12:
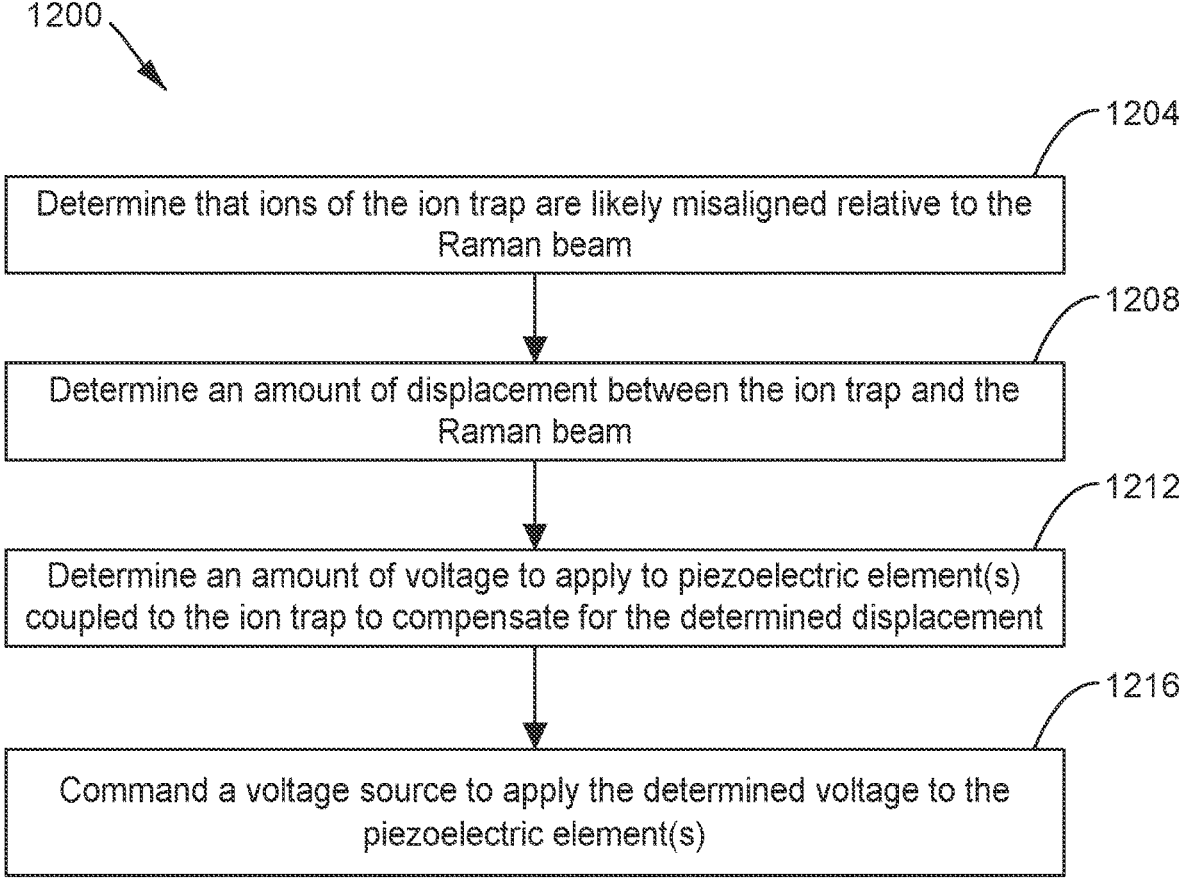
FIG. 12 illustrates a method for repositioning an ion trap in accordance with aspects of this disclosure.

FIG. 12 illustrates a method 1200 for repositioning an ion trap 270, 1000 according to an aspect of the present disclosure. The method 1200 can be enacted by a controller such as the controller 205. The method 1200 can be used to position the ion traps 270 (e.g., via the repositionable ion trap systems 700, 800, 900), 1000 relative to a Raman beam 400 or components of the imaging system 230. The method 1200 is described herein with respect to the repositionable ion trap system 700 and the Raman beam 400 merely for the sake of brevity.

At 1204, the controller 205 may determine that the ions 408 of the ion trap 270 are likely misaligned relative to the Raman beam 400. In some aspects, the controller 205 may determine that the ions 408 are likely misaligned relative to the Raman beam 400 based on signals received from the ions 408. In some aspects, the controller 205 may determine that the ions 408 are likely misaligned with the Raman beam 400 based on other received signals. For example, a splitter may be configured to split the Raman beam 400 into first and second beams that have known positions relative to each other. The first beam may be used to address the ions 408. The second beam may be used to illuminate a target. In some aspects, the target may be integrated or lithographically processed into the ion trap 270. In such an aspect, the controller 205 may be configured to monitor the target and determine whether the first beam is likely aligned with the ions 408 based on a position of the second beam on the target. In some aspects, the first and second beams may be parallel beams that are offset from each other.

At 1208, in response to determining that the ions 408 are likely misaligned relative to the Raman beam 400, the controller 200 may determine an amount of displacement between the ion trap 270 and the Raman beam 400. In aspects in which the repositionable ion trap system 700 includes multiple piezoelectric elements 704, the controller may determine a direction of the displacement (e.g. along one or more of the X-axis, Y-axis, and/or Z-axis of the coordinate plane 728).

At 1212, the controller 205 determines an amount of voltage to apply to the piezoelectric element 704 to compensate for the displacement determined at 1208. In aspects that include multiple piezoelectric elements 704, the controller 205 may determine an amount of voltage to apply to each of the piezoelectric elements 704.

At 1216, the controller 205 commands a voltage source to apply the determined voltage to the piezoelectric element(s) 704. The voltage source applies the determined voltage to the piezoelectric elements(s) 704 until the voltage source is commanded to apply a different amount (e.g., increase or decrease) of voltage to the piezoelectric element(s) 794, stop applying voltage, and so forth.

In aspects in which the method 1200 is used for calibration, the controller 205 may run the method 1200 once. In aspects in which the method 1200 is used for active adjustment of the position of the ion trap 270, the method 1200 may run continuously or according to a predefined time interval. For example, in aspects in which the displacement is determined based on the ions 408, the method 1200 may run according to a predefined time interval. In aspects in which the displacement is determined by proxy, the method 1200 may run continuously.

In some aspects, the piezoelectric element 704 can be used to dynamically reposition the ion trap 270 relative to the Raman beam 400 during operation of the QIP system 200. Dynamic adjustments may compensate for recurrent disturbances to the Raman beam 400 and/or the trap 270 due to vibrations from the foundation supporting the quantum computer, flexion of the optical table, and so forth. In such aspects, the voltage applied to the piezoelectric element 704 is configured to cause displacement of the piezoelectric element 704 (and therefore movement of the ion trap 270) at the nanometer (nm) or micrometer (μm) scale. In such aspects, the displacements may be at the scale of a few micrometers, hundreds of nanometers, tens of nanometers, or even less.

In some aspects, the determined voltage is continuously adjusted to dynamically reposition the ion trap 270 to maintain alignment of the trapped ions in the ion trap 270 with the Raman beam 400.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A quantum information processing (QIP) system comprising:
    an ion trap system comprising:
        an ion trap substrate configured to trap one or more ions;
        a piezoelectric element coupled to the ion trap substrate; and
        a carrier configured to transmit signals between the ion trap substrate and components of the QIP system.

2. The QIP system of claim 1, wherein the piezoelectric element is configured to undergo a displacement in response to an applied voltage, the displacement configured to dynamically adjust a position of the ion trap substrate relative to the carrier.

3. The QIP system of claim 2, wherein the piezoelectric element is a first piezoelectric element and the displacement is a first displacement, and wherein the ion trap system further comprises:
    a second piezoelectric element configured to undergo a second displacement, the second displacement configured to dynamically adjust the position of the ion trap substrate relative to the carrier in a different direction than the first displacement.

4. The QIP system of claim 2, wherein the piezoelectric element is one of a plurality of piezoelectric elements configured to undergo a plurality of displacements, wherein each one of the plurality of piezoelectric elements is configured to dynamically adjust the position of the ion trap substrate relative to the carrier in different directions than the displacements of the other piezoelectric elements in the plurality of piezoelectric elements.

5. The QIP system of claim 1, further comprising:
    a laser configured to generate a Raman beam; and
    a controller having a processor and a memory, the memory including instructions executable by the processor to:
    identify a misalignment between the Raman beam and the one or more trapped ions; and
    apply a voltage to the piezoelectric element to dynamically adjust a position of the ion trap substrate to align the one or more trapped ions with the Raman beam.

6. The QIP system of claim 1, further comprising:
    an imaging system comprising at least one of a lens and a detector; and a controller having a processor and a memory, the memory including instructions executable by the processor to:

identify a misalignment between at least one of the lenses and one of the detectors and the trapped ions; and apply a voltage to the piezoelectric element to dynamically adjust a position of the ion trap substrate to align the one or more trapped ions with at least one of the lenses and one of the detectors.

7. A method for active piezoelectric stabilization of an ion trap, the method comprising:

determining, by a controller including a processor and a memory, that ions trapped in an ion trap substrate are likely misaligned relative to a Raman beam;

determining, by the controller, an amount of displacement between the ion trap substrate and the Raman beam;

determining, by the controller, an amount of voltage to apply to a piezoelectric element coupled to the ion trap substrate to compensate for the determined displacement; and commanding, by the controller, a voltage source to apply the determined voltage to the piezoelectric element to adjust a position of the ion trap substrate to align the ions trapped in the ion trap substrate with the Raman beam.

8. The method of claim 7, wherein the determined voltage is adjusted to dynamically reposition the ion trap substrate to maintain alignment of the trapped ions in the ion trap with the Raman beam.

9. The method of claim 8, wherein the determined voltage is continuously adjusted.

10. The method of claim 8, wherein the determined voltage is adjusted to based on a predefined time interval.

11. The method of claim 7, wherein the determined voltage is applied during a calibration sequence.

12. The method of claim 7, wherein the piezoelectric element is a first piezoelectric element configured to move the ion trap substrate in a first direction and wherein a second piezoelectric element coupled to the ion trap substrate is configured to move the ion trap substrate in a second direction different than the first direction, and wherein the method includes:

determining, by the controller, an amount of voltage to apply to the second piezoelectric element coupled to the ion trap substrate to compensate for the determined displacement; and commanding, by the controller, the voltage source to apply the determined voltage to the second piezoelectric element to adjust the position of the ion trap substrate to align the ions trapped in the ion trap substrate with the Raman beam.

13. The method of claim 7, wherein the method includes determining that the trapped ions are likely misaligned relative to the Raman beam based on signals received from the trapped ions.

14. The method of claim 7, wherein the Raman beam is split into first and second beams by a splitter, wherein the first beam is configured to address the ions and wherein the second beam is configured to contact a target, and wherein the method includes determining that the ions are likely misaligned relative to the Raman beam based on a position of the second beam on the target.

15. A method for active piezoelectric stabilization of an imaging system including at least one of a lens and a detector, the method comprising:

determining, by a controller including a processor and a memory, that ions trapped in an ion trap substrate are likely misaligned relative to at least of one of the lens and the detector;

determining, by the controller, an amount of displacement between the ion trap substrate and at least one of the lens and the detector;

determining, by the controller, an amount of voltage to apply to a piezoelectric element coupled to the ion trap substrate to compensate for the determined displacement; and commanding, by the controller, a voltage source to apply the determined voltage to the piezoelectric element to adjust a position of the ion trap substrate to align the ions trapped in the ion trap substrate with at least one of the lens and the detector.

16. The method of claim 15, wherein the determined voltage is adjusted to dynamically reposition the ion trap substrate to maintain alignment of the trapped ions in the ion trap substrate with at least one of the lens and the detector.

17. The method of claim 16, wherein the determined voltage is continuously adjusted.

18. The method of claim 16, wherein the determined voltage is adjusted based on a predefined time interval.

19. The method of claim 15, wherein the determined voltage is applied during a calibration sequence.

20. The method of claim 15, wherein the piezoelectric element is a first piezoelectric element configured to move the ion trap substrate in a first direction and wherein a second piezoelectric element coupled to the ion trap substrate is configured to move the ion trap substrate in a second direction different than the first direction, and wherein the method includes:

determining, by the controller, an amount of voltage to apply to the second piezoelectric element coupled to the ion trap substrate to compensate for the determined displacement; and commanding, by the controller, the voltage source to apply the determined voltage to the second piezoelectric element to adjust the position of the ion trap substrate to align the ions trapped in the ion trap with at least one of the lens and the detector.

21. The method of claim 15, wherein the method includes determining that the ions are likely misaligned relative to at least one of the lens and the detector based on signals received from the trapped ions.

22. The method of claim 15, wherein a Raman beam is split into first and second beams by a splitter, wherein the first beam is configured to address the ions and wherein the second beam is configured to contact a target, and wherein the method includes determining that the ions are likely misaligned relative to at least one of the lens and the detector based on a position of the second beam on the target.

* * * * *